Oct. 31, 1933.    H. L. McQUISTON    1,932,704
AUTOMATICALLY AND MANUALLY OPERABLE VALVES
Filed Oct. 17, 1932    2 Sheets-Sheet 1
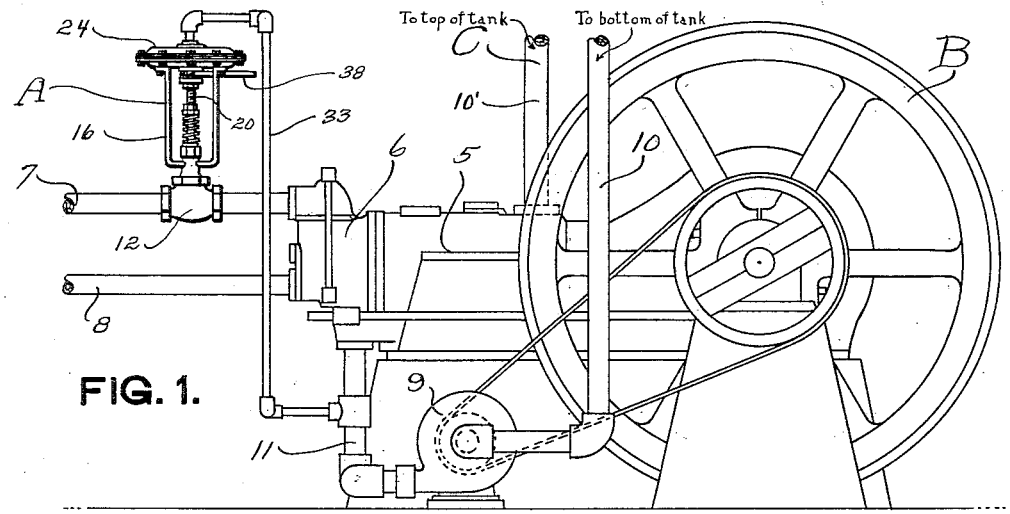
FIG. 1.
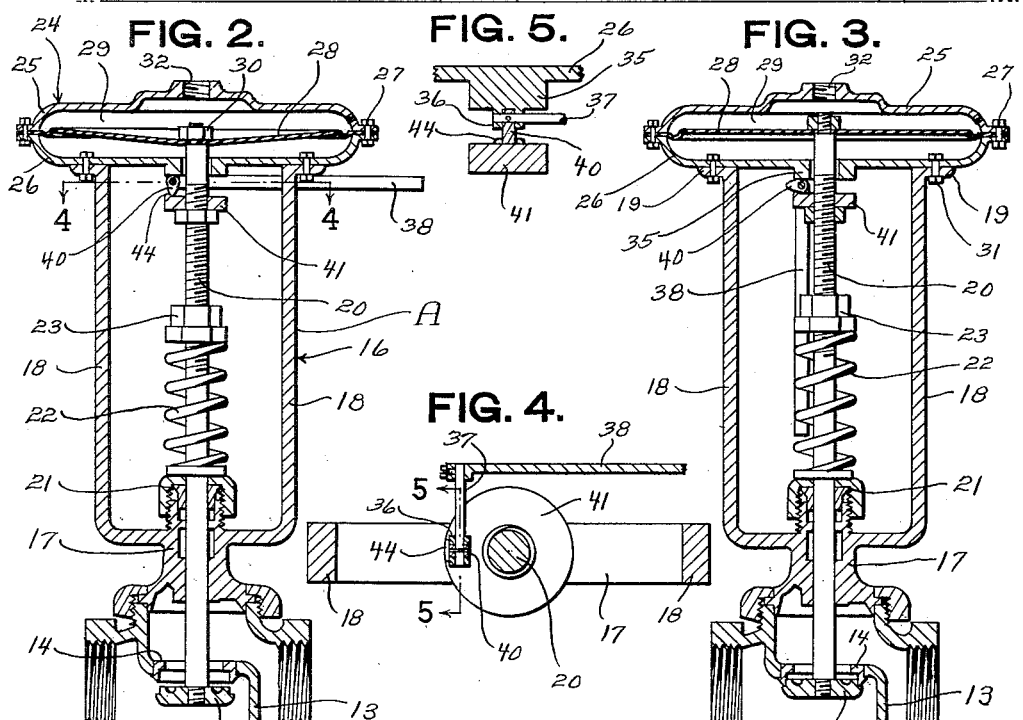
INVENTOR.
Horace L. McQuiston Oct. 31, 1933.    H. L. McQUISTON    1,932,704
AUTOMATICALLY AND MANUALLY OPERABLE VALVES
Filed Oct. 17, 1932    2 Sheets-Sheet 2
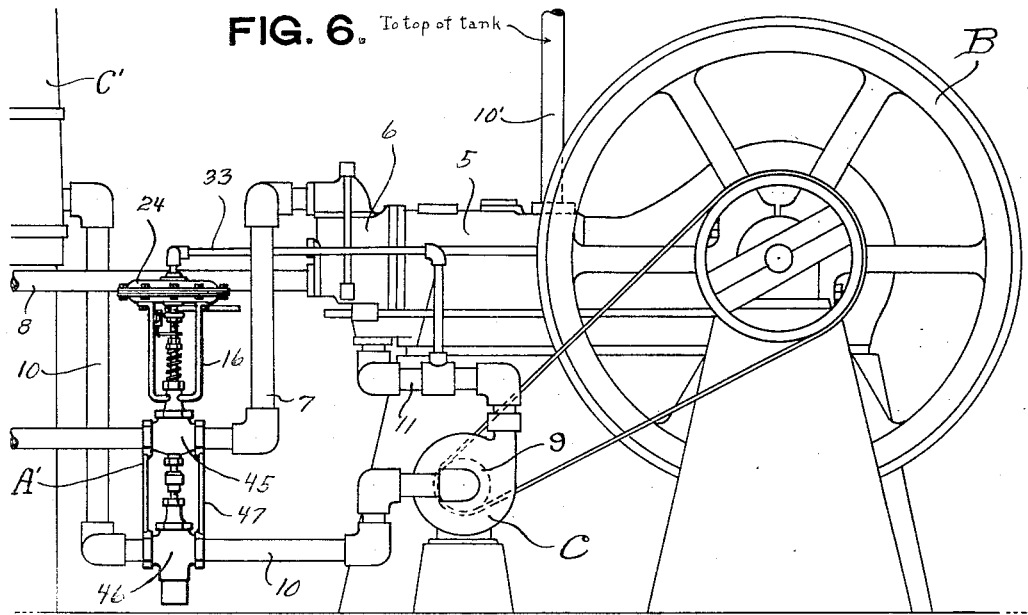
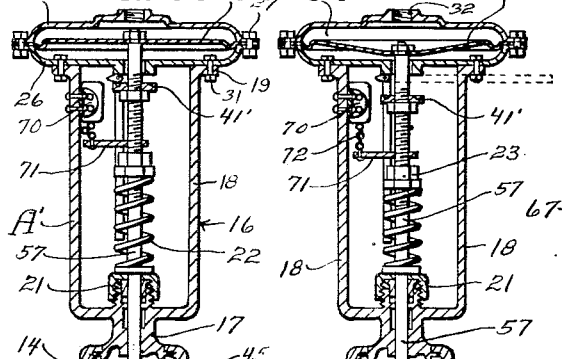
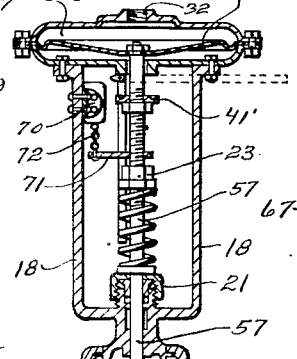
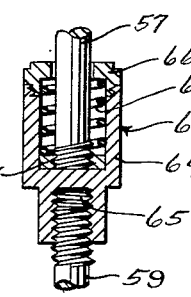
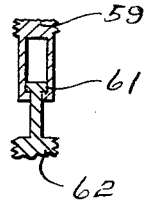
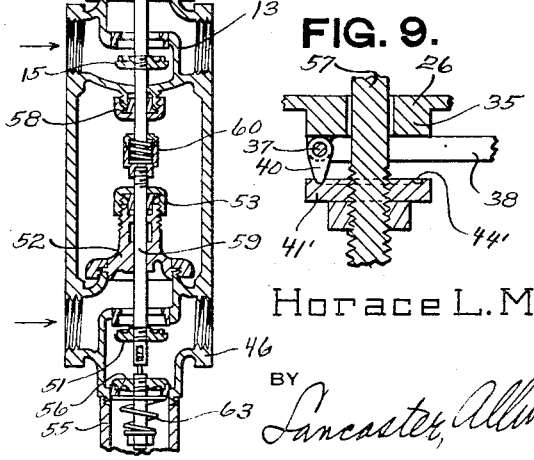
INVENTOR.
Horace L. McQuiston
BY
Lancaster, Allwine and Rommel
ATTORNEYS.

Patented Oct. 31, 1933

1,932,704

UNITED STATES PATENT OFFICE 1,932,704

AUTOMATICALLY AND MANUALLY OPERABLE VALVES

Horace L. McQuiston, Wichita, Kans., assignor to Phillips Petroleum Company, Bartlesville, Okla., a corporation Application October 17, 1932. Serial No. 638,204

14 Claims. (Cl. 123—196)

The present invention relates to control valves and the primary object of the invention is to provide an improved device of this character for automatically controlling the flow of gases or liquids in a pipe line by variations in pressure in the line.

A further object of the invention is to provide a control valve embodying an arrangement whereby the valve may either be manually or automatically operated, the manually operable means being automatically released for automatic operation of the valve upon the building up of a pressure slightly beyond that required for retaining the valve open.

A further object of the invention is to provide an adjustable diaphragm operated valve which will act to automatically shut off the fuel supply to an engine upon failure in operation of the engine.

A further object of the invention resides in the provision of diaphragm operated control valve means adapted to be associated with the fuel supply line and the circulating water cooling line of gas engines to insure against loss or release of gas upon failure in operation of the engine; to stop the flow of the cooling water and automatically drain the engine jacket, circulating pump and piping system on the discharge side of the valve means upon failure in operation of the engine; to automatically shut off the fuel supply of the engine upon failure in cooling water circulation; and to automatically ground the ignition circuit to the engine when it exceeds its normal operating speed.

A further object of the invention resides in the novel arrangement whereby the means for manually opening the control device to permit starting of the engine, is released upon a building up of pressure in the diaphragm chamber of the device.

Other objects and advantages of the invention will be apparent during the course of the following detailed description, taken in connection with the accompanying drawings, forming a part of this specification, and in which drawings:—

Figure 1 is a side elevation of the control device shown placed in the fuel supply line of a gas engine and operatively conected with the water cooling system to shut off the supply of fuel upon failure in operation of the engine.

Figure 2 is an enlarged sectional view through the valve shown in Figure 1 and showing the valve held open by the manually operable means.

Figure 3 is a sectional view showing the valve closed.

Figure 4 is an enlarged fragmentary section on the line 4—4 of Figure 2.

Figure 5 is a sectional view on the line 5—5 of Figure 4.

Figure 6 shows a modified form of the control device associated with a gas engine in a manner to automatically control flow of cooling water and allow draining of the water at the discharge side of the device upon failure in engine operation.

Figure 7 is an enlarged vertical section through the control device shown in Figure 6 and showing the two stop valves closed and the drain valve open.

Figure 8 is a view similar to Figure 7 and showing the position of the valve discs during normal operation of the engine.

Figure 9 is an enlarged fragmentary section showing a slightly modified arrangement of the means for manually opening the two stop valves.

Figure 10 is a top plan view of the bushing or unseating disc shown in Figure 9.

Figure 11 is an enlarged fragmentary section showing the adjustable and yieldable coupling between the sections of the valve stem for the two stop valves.

Figure 12 is a fragmentary sectional view of the sliding link connection between the main valve stem and the stem of the drain valve.

Referring to the drawings in detail wherein similar reference characters designate corresponding parts throughout the several views, and referring first to the form of invention disclosed in Figures 1 to 5, A has been shown merely by way of illustration, associated with a gas engine B for automatically shutting off the flow of gas upon failure in operation of the engine, and in the example shown the valve is connected with the water cooling system C of the engine so that the engine will be stopped upon failure of water circulation through the cooling system.

The gas engine B is of conventional construction having the cylinder 5 and cylinder head 6 with which is connected a fuel supply pipe 7 and the exhaust pipe 8. The cooling system C embodies a circulating water pump 9 which circulates the cooling water through the engine and may be belt driven from the engine as shown or in any preferred manner. The inlet of the pump 9 is connected by a suction or circulating pipe 10 to the bottom of a water supply tank C' such as illustrated in Figure 6, while the discharge outlet of the pump is connected to the water jacket of the engine cylinder by the pressure pipe 11. A return pipe 10' connects the engine cylinder with the top of the water supply tank C' whereby a constant circulation of water through the engine is assured by the circulating pump.

Referring now to the specific construction of the control device or valve A, the same embodies a valve body 12 adapted to be interposed in the fuel supply pipe 7 and this valve body may either be of the threaded type shown or flanged if so desired. The valve body 12 is provided with the usual partition 13 having the valve seat 14 against which the valve disc 15 seats for shutting off passage of gas or fluid through the valve body. This valve disc 15 as will be observed is disposed below the partition 13 and is movable upwardly into engagement with the under side of the valve seat 14.

Secured to the upper side of the valve body 12 is a diaphragm frame 16 embodying a base portion 17 and upstanding parallel arms 18 having outturned upper ends 19. Vertically guided through the base portion 17 of the frame 16 is a valve stem 20 having a substantial portion of its upper end screw threaded. A packing gland 21 is provided for the valve stem 20 where it extends through the base portion 17 into the chamber of the valve body 12. The valve disc 15 is secured in any preferred manner to the lower end of the stem 20 for movement thereby.

Encircling the valve stem 20 above the packing gland 21 is an expansion coil spring 22 having its lower end acting upon the packing gland and its upper end abutting an adjusting nut 23 threaded on the upper portion of the valve stem. This coil spring 22 tends to normally seat the valve disc 15 and the tension of this spring may be varied by the adjusting nut 23. As will readily be apparent, adjustment of the nut 23 will vary the pressure required for unseating the disc 15.

Secured to the outturned upper ends 19 of the arms 18 axially of the valve stem 20 is a diaphragm casing 24 embodying an upper or cap section 25 and a lower section 26, these sections being clamped together by suitable bolts 27 extended through peripheral flanges provided on each of the sections. The lower section 26 is secured to the outturned arm portions 19 by suitable bolts 31. Arranged in the casing 24 is a diaphragm 28 having its peripheral portion clamped between the flanges of the sections 25 and 26 by the bolts 27. The upper casing section 25 and the diaphragm 28 form a diaphragm chamber 29 above the diaphragm. The upper end of the valve stem 20 projects through an opening in the lower casing section 26 and is rigidly secured to the center of the diaphragm 28 as by a nut 30. Thus, flexing of the diaphragm 28 by pressure in the chamber 29 will impart downward movement to the valve stem 20 for unseating the disc 15.

The upper casing section 25 is provided with a pressure inlet port 32 having connected thereto one end of a pressure line 33 which is connected to the wated circulating pipe 11 at the discharge side of the pump 9. Thus, so long as the pump 9 is properly operating for circulating the cooling water through the engine, the pressure of this cooling water will act upon the diaphragm 28 and cause the valve disc 15 to be unseated and permits passage of fuel through the supply pipe 7 to the engine. Upon failure of water circulation by the pump 9, causing a reduction in pressure in the diaphragm chamber 29, the valve disc 15 will be seated by the spring 22 and thus automatically stopping flow of fuel to the engine. Thus the control valve serves to prevent damage being done to the engine by overheating, by cutting off the supply of fuel in the event of improper functioning of the cooling system.

An arrangement is also provided for manually opening the valve and this manually operable means is so arranged as to be automatically released upon a building up of pressure in the diaphragm chamber 29 so that operation of the valve may be automatic. Formed axially of the lower diaphragm casing section 26 is a depending sleeve or collar 35 and through which the valve stem 20 has a loose fit for venting the casing 24 below the diaphragm 28. Depending from the collar 35 is a pair of apertured ears 36 for pivotal mounting of a horizontally disposed cam shaft 37. Secured to the outer end of the shaft 37 is an operating lever 38 whereby rotation may be imparted to the shaft. Fixed on the inner end of the shaft 37 between the ears 36 is a cam 40 adapted to engage the upper surface of a suitable bushing or unseating disc 41 threaded on the valve stem 20 and adjustable therealong. This cam 40, as is shown clearly in Figure 2, is attached to the shaft 37 with its major length at a right angle or at an angle of 90° to the longitudinal axis of the operating lever 38. The bushing or unseating disc 41 is provided on its upper side and adjacent the peripheral edge thereof with an upstanding lip 44 forming a stop for the relatively sharp nose of the cam 40 when the operating lever 38 is in a horizontal position. When the cam 40 is swung to manually unseat the valve disc 15, the weight of the operating lever 38 holds the nose of the cam against the lip 44 as in Figure 2.

Considering Figure 3, when manually opening the valve, the operating lever 38 is swung in a counter clock-wise direction until the nose of the cam 40 rides past the lip 44 and at which time the operating lever will be in a horizontal position as in Figure 2 and held in such position by engagement of the cam against the lip. The valve stem 20 is thus forced down unseating the valve disc 15. Upon building up of a pressure in the chamber 29 the diaphragm 28 is further flexed, lowering the bushing 41 so that the lip 44 no longer engages the nose of the cam 40, whereupon the weight of the operating lever 38 returns the cam to a normal position. The valve disc 15 will now be seated upon a reduction of pressure in the chamber 29.

Thus it will be seen that the valve may either be operated automatically or manually and that the manually operated means is automatically released upon a building up of pressure in the diaphragm chamber 29.

In operation of the device shown in Figures 1 to 5 inclusive for automatically shutting off the supply of fuel to the engine B upon failure in operation of the engine, the valve disc 15 is first manually unseated by the cam 40 through swinging the operating lever 38 from a vertical position as in Figure 3 to a horizontal position as in Figure 2. The engine may then be started and cooled by forced circulation of the water through the engine by the circulating pump 9. Operation of the pump 9 creates a pressure in the control line 33 so that a pressure is built up in the diaphragm chamber 29. This pressure in the chamber 29 lowers the valve stem 20 and bushing 41 so that the lip 44 is lowered out of holding engagement with the cam 40 allowing the weight of the lever 38 to swing the cam 40 out of engagement with the bushing. The valve is now set for automatic operation and so long as the pump 9 is in operation, pressure in the chamber 29 holds the valve disc 15 unseated permitting flow of fuel to the engine. Upon failure of water circulation, resulting in a reduction in pressure on the diaphragm 28, the disc 15 is seated by the spring 22 thus automatically shutting off flow of fuel to the engine.

Referring now to the form of control device A' shown in Figures 6 to 12 inclusive, like reference characters have been applied to parts which are similar to those shown in Figures 1 to 5 inclusive. In the form of control device A', an arrangement is provided embodying two stop valves and a drain valve so operatively connected as to control the fuel supply to the engine; control flow of the cooling water, and also allow for draining of the water at the discharge side of the control device.

The control device A' embodies an upper or fuel stop valve 45 interposed in the fuel supply pipe 7, and a lower or water stop valve 46 interposed in the suction pipe 10, the lower stop valve embodying a drain valve adapted to open upon closing of the stop valves 45 and 46. The upper stop valve 45 embodies the valve body 12' having the partition 13 provided with a seat 14 against the under side of which the valve disc 15 seats for controlling passage of gas to the engine. The diaphragm frame 16 is secured to the upper side of the valve body 12' by the base portion 17.

The lower stop valve 46 is mounted directly below the stop valve 45 and is preferably secured in fixed spaced relation thereto as by the ties or straps 47. The valve 46 embodies the valve body 48 provided with the partition 49 having a seat 50 against the under side of which the valve disc 51 seats for controlling passage of water through the valve body. The upper side of the valve body 48 is provided with a hood or cap 52 having a packing gland 53.

The drain valve embodied in the lower stop valve 46 embodies a seat 54 provided in the lower side of the valve body 48 axially of the seat 50 and opening to a drain pipe or outlet 55. A valve disc 56 is adapted to seat upon the seat 54 for controlling draining of water from the cooling system upon stopping of the engine.

Vertically guided through the base portion 17 of the frame 16 is an upper valve stem section 57 upon which the valve disc 15 is mounted. This upper valve stem 57 extends downwardly through a packing gland 58 in the lower side of the valve body 12' and has its lower end connected to the upper end of a lower valve stem section 59 as by an adjustable and yieldable coupling 60. This lower valve stem 59 extends through the packing gland 53 into the valve body 48 and carries the valve disc 51. Thus the valve discs 15 and 51 are connected for unitary movement by the diaphragm 28.

Connected by a link connection 61 to the lower end of the lower valve stem 59 is a minor or drain valve stem 62 upon which the drain valve disc 56 is mounted. This valve stem 62 extends through the seat 54, and an expansion coil spring 63 encircles the stem with one end acting upon the under side of the seat 54 and its opposite end acting upon a nut at the lower end of the stem whereby the disc 56 is normally urged to a closed position. This link connection 61 is such as to permit a certain amount of vertical movement of the valve stems 57 and 59 independent of the stem 62, and also allows for the stems 57 and 59 to move downward after the drain valve disc 6 is fully seated.

The adjustable coupling 60 which aside from permitting ready and easy assembling and dismantling of the valve assembly, also acts to compensate for wear of discs and seats, unequal spacing of the valve discs and seats, and also insures uniform seating of the valve discs 15 and 51. The coupling 60 embodies a tubular body portion 64 having at its lower end a threaded socket 65 for threaded reception of the threaded upper end of the lower valve stem 59. The upper end of the body portion 64 is closed by a cap 66 through which the lower end of the upper valve stem 57 extends, the stem 57 carrying a disc 67, between which and the cap 66 is a coil spring 68 acting to normally urge the stems 57 and 59 axially toward one another.

Referring particularly to Figures 9 and 10, detailing a slightly modified arrangement of the manually operable means for opening the valves when starting the engine, the bushing or unseating disc 41' for threading on the upper valve stem 57 is provided on its upper side with an annular retaining groove 44' for receiving the nose of the cam 40. With this groove arrangement, a more minute adjustment of the unseating disc 41' may be had since it is not required that a full or complete turn be given the disc for aligning the lip 44 with the cam 40 as in the arrangement shown in Figures 4 and 5.

An arrangement is also provided for grounding the ignition circuit of the engine in the event that the engine exceeds a certain predetermined speed, and this means embodies an electric switch 70 mounted upon one of the arms 18 of the diaphragm frame 16 and suitably connected in the ignition circuit. An actuating arm 71 is adjustably connected to the upper valve stem 57 and this arm is connected by a flexible coupling 72 to the switch 70 whereby the switch will be closed for stopping the engine when the stem 57 nears its limit of downward travel, and no actuating movement is imparted to the switch upon upward travel of the valve stem.

In operation of the device shown in Figures 6 to 12, when the engine is operating properly, the condition of the device is like that shown in Figure 8 and from which it will be noted that the valve disc 15 is unseated permitting passage of fuel to the engine; the valve disc 51 unseated permitting proper circulation of the cooling water, and the valve disc 56 closed. Upon lowering of pressure in the diaphragm chamber 29, the discs 15 and 51 are automatically closed by the spring 22 shutting off flow of fuel and water to the engine, while the disc 56 is raised permitting draining of water from the engine and pump and preventing damage due to freezing. Should the engine exceed its normal operating speed, resulting in an increase in pressure in the diaphragm chamber 29, the ignition grounding switch is closed and the engine stopped. Stopping of the engine lowers the pressure in the chamber 29 and allows seating of the discs 15 and 51 and unseating of the disc 56.

While the device has been shown and described for use in connection with gas engines, it will be readily apparent that the device may be used in any number of ways for automatically controlling passage of gas or fluids through a pipe line.

Changes in the shape, size, and arrangement of parts may be made to the form of invention herein shown and described, without departing from the spirit of the invention or the scope of the following claims.

I claim:

1. In a control device for engines having a fuel supply pipe and a water cooling system embodying a suction pipe, a pair of valves arranged one in each of said pipes for controlling flow therethru, a valve stem connecting the valves for unitary operation, spring means normally urging the stem to a position closing the valves, and a pressure operated diaphragm operable by pressure in the water cooling system and acting upon the valve stem for opening the valves against the tension of said spring means.

2. In a control device of the class described, the combination with an engine having a fuel supply pipe, and a water cooling system embodying a water circulating pipe; of a stop valve interposed in the fuel pipe and having a stem, a stop valve interposed in the water circulating pipe and having a stem, means connecting the stems of the valves for unitary and like operation of the valves, spring means normally urging the valves to a closed position, and pressure operated means actuated by the engine when running and acting upon the connected valve stems for opening said valves against the tension of said spring means.

3. In a control device of the class described, the combination with an engine having a fuel supply pipe, and a water cooling system embodying a water circulating pipe; of a stop valve interposed in the fuel pipe, a stop valve interposed in the water pipe, a valve stem connecting the valves for unitary operation, spring means normally urging the valves to a closed position, a drain valve for the water circulating pipe and automatically closed upon opening of said stop valves, and pressure operated means operable upon failure in engine operation to close the stop valves against the tension of said spring means and to open said drain valve.

4. In a control device for engines having a fuel supply pipe and a water cooling system embodying a suction pipe, a fuel control valve interposed in the fuel supply pipe, a reciprocable valve stem for the valve, a water control valve interposed in the suction pipe, a reciprocable valve stem for the water control valve, means connecting the valves in vertically spaced relation with the fuel control valve uppermost, an adjustable and yieldable coupling connecting said valve stems, pressure operated means acting upon said valve stems for opening said valves, spring means normally closing said valves, a drain valve associated with the water control valve and embodying a valve stem, a sliding link connection between the drain valve stem and stem of the water control valve, and spring means normally closing the drain valve.

5. In a fuel and water control device for gas engines, a fuel control valve, a water control valve, means connecting the valves in superposed relation, a valve stem connecting the valves for unitary and like operation, a drain valve formed in the water control valve and operatively connected to said valve stem for operation opposite to that of the control valves, and pressure operated means for opening the control valves and permitting closing of the drain valve.

6. In a control device of the class described, a valve having a reciprocable valve stem, spring means normally urging the stem to a position closing the valve, a pressure operated diaphragm acting upon the stem for opening the valve against the tension of said spring means, and manually operable cam means acting upon the stem to hold the valve open independent of the diaphragm, said manually operable cam means being automatically released by pressure acting upon the diaphragm whereby the valve is set for automatic operation.

7. In a control device of the class described, a valve having a reciprocable valve stem, spring means normally urging the stem to a position closing the valve, a cam acting upon the stem to open the valve against the tension of the spring means, an operating lever for the cam, and a pressure operated diaphragm connected to the stem for opening the valve against the tension of said spring means, said valve stem when moved to a valve opening position by the diaphragm permitting return of said cam to a normal position by the weight of said operating lever.

8. In a control device of the class described, a valve having a vertically reciprocable valve stem, spring means normally urging the stem to a position closing the valve, a pressure operated diaphragm connected to the upper end of the stem for opening the valve against the tension of said spring means, a disc carried by the valve stem and having a projection at its upper side, a cam shaft journaled horizontally at one side of the valve stem above the disc, a cam fixed on the cam shaft, and engageable with said disc for opening the valve, and an operating lever fixed upon the cam shaft at a right angle to the major length of the cam, said cam engaging the projection on said disc for releasably holding the operating lever in a horizontal position and permitting release of the cam by the operating lever upon a building up of pressure upon said diaphragm.

9. In a control device of the class described, a valve having a vertically reciprocable valve stem, a valve disc carried by the lower end of the stem, spring means normally urging the valve stem to a closed position, a diaphragm chamber at the upper end of the stem, a diaphragm in the chamber and connected to the valve stem for unseating the disc, a bushing carried by the valve stem below the diaphragm casing, a cam shaft journaled upon the under side of the diaphragm casing, a cam fixed on the shaft and releasably engageable with the bushing for manually unseating the disc, and an operating lever carried by the shaft and gravity operated for releasing the cam upon a building up of pressure in the diaphragm chamber.

10. In a control valve of the class described, the combination of a valve body having inlet and outlet ports, a valve member for controlling communication between the ports, a valve stem connected to the valve member for actuation thereof and projecting upwardly from the valve body, spring means acting upon the valve stem for normally seating the valve member, a diaphragm frame carried by the valve body, a diaphragm chamber supported upon the upper end of the diaphragm frame, a diaphragm in the casing and connected with the upper end of the valve stem and acting to force the stem downwardly for unseating the valve member, and manually operable means acting upon the valve stem for unseating the valve member, said manually operable means being automatically released upon a predetermined downward movement of the valve stem by the diaphragm.

11. In a fuel control device for engines having a fuel supply pipe, a valve interposed in the fuel supply pipe for controlling passage of fuel to the engine, manually operable, gravity returned control means for holding the valve open, and pressure operated valve control means operable to permit automatic release of the manually operable control means and allow for automatic operation of the valve by the pressure operated control means.

12. In a fuel control device for engines having a fuel supply pipe and a water cooling system having a forced circulation; a valve interposed in the fuel supply pipe and having a valve stem, a diaphragm casing carried by the valve, a diaphragm in the casing and connected to the valve stem, said diaphragm providing a diaphragm chamber, a control line forming communication between the cooling system and diaphragm chamber, and acting upon the diaphragm to open the valve upon a building up of pressure in the diaphragm chamber, spring means normally closing the valve, and manual control means for opening the valve, said manual control means being automatically released to set the valve for automatic operation upon the building up of pressure in the diaphragm chamber slightly beyond that required to move the diaphragm to the position it is moved by the manual control means.

13. In a fuel control device for engines having a fuel supply pipe, a cooling system embodying a circulating pump, and an ignition system; a valve interposed in the fuel supply pipe and having a valve stem, diaphragm operated means for opening the valve, a pressure line between the cooling system and diaphragm means, and an ignition control switch operable upon movement of the valve stem to an open position beyond a predetermined point.

14. In an engine control device, a fuel control valve, a water control valve, a drain valve for the water control valve, coupling means between said valves, and operating means connected with the coupling means for unitary and like operation of the control valves and opposite operation of the drain valve to that of the control valves.

HORACE L. McQUISTON.